United States Patent

[11] 3,601,489

[72] Inventor Zeger Van Gelder
Emmasingel, Netherlands
[21] Appl. No. 854,990
[22] Filed Sept. 3, 1969
[45] Patented Aug. 24, 1971
[73] Assignee U.S. Philips Corporation
New York, N.Y.
[32] Priority Sept. 4, 1968
[33] Netherlands
[31] 6,812,602

[54] GAS-DISCHARGE LAMP FOR PRODUCING MODULATED ATOMIC RESONANCE RADIATION
7 Claims, 3 Drawing Figs.
[52] U.S. Cl. ................................................. 356/97,
313/192, 313/204, 356/87
[51] Int. Cl. ..................................................... G01j 3/42,
H01i 17/02
[50] Field of Search ........................................ 313/204,
209, 185, 192; 356/74, 85–87, 96, 97

[56] References Cited
UNITED STATES PATENTS
3,405,304 10/1968 Gillies et al. ................... 313/218
3,406,308 10/1968 Yamasaki ....................... 313/217 X
3,433,963 3/1969 Walsh et al. ................... 313/178 X
3,546,521 12/1970 Van Gelder .................... 313/192

OTHER REFERENCES
Sullivan et al.: " High Intensity Hollow-Cathode Lamps" Spectrochimica Acta volume 21, April 1965, pages 721– 726

Bowman et al.: " Isolation of Atomic Resonance Lines by Selective Modulation," Spectrochimica Acta volume 22, February 1966 pages 205– 210

Primary Examiner—Ronald L. Wibert
Assistant Examiner—F. L. Evans
Attorney—Frank R. Trifari ABSTRACT: A gas-discharge lamp for producing modulated atomic resonance radiation comprising a hermetically sealed cylindrical envelope having a window at one end, two electrodes between which a positive column discharge in a rare gas is maintained during operation by means of a direct-voltage difference, a sputtering electrode essentially consisting of an element having desired resonance radiation characteristics, and a ring to confine the resonance radiation along the axis of the positive column discharge which is located in such a manner that it intersects the window. The sputtering electrode and the ring surround the positive column with the ring positioned between the sputtering electrode and the electrode at the window end. The ring, extending up to the vicinity of the sputtering electrode, has an inner diameter which is smaller than that of the sputtering electrode and a length which is at least equal to the inner diameter. Furthermore, a generator is provided from which a voltage of periodically varying values is applied to the sputtering electrode. The lamp may comprise a plurality of sputtering electrodes and may be used in apparatus for measuring absorption of atomic resonance radiation, particularly for determining traces of elements in a sample.

INVENTOR.
ZEGER VAN GELDER

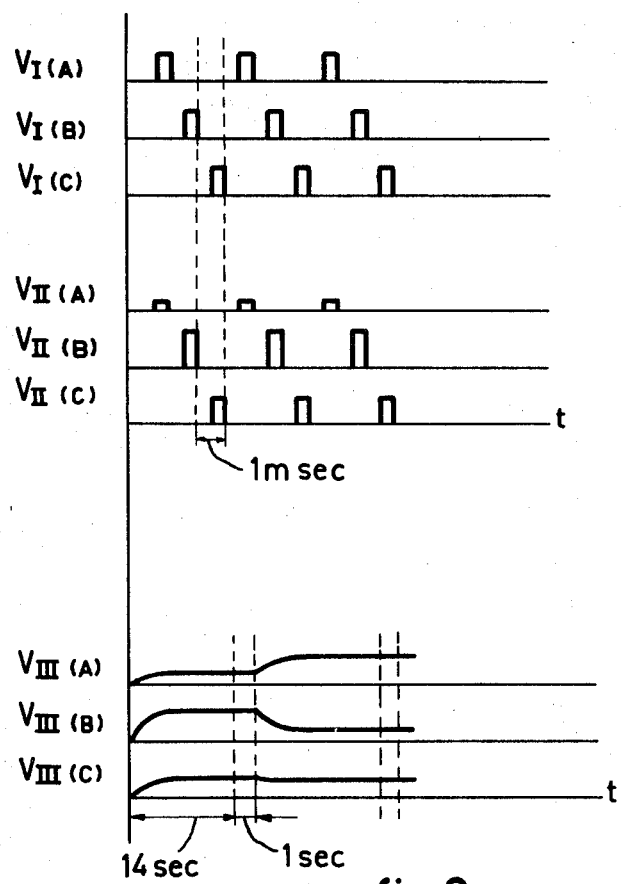

GAS-DISCHARGE LAMP FOR PRODUCING MODULATED ATOMIC RESONANCE RADIATION

The invention relates to a device for producing modulated atomic resonance radiation and to an apparatus for measuring absorption of atomic resonance radiation provided with such a device.

Atomic resonance radiation of elements is often used in spectroscopy and particularly in resonance absorption spectroscopy for the qualitative and quantitative determination of the constituents of an unknown sample. A solution of the sample is, for example, sprayed in an atmospheric flame so that the solution evaporates and atoms of the sample are introduced in the flame in vapor form. If the resonance radiation of a given element is passed through the flame, this radiation will be more or less absorbed dependent on whether there are more or fewer atoms of this element present in the sample. Furthermore resonance radiation may be used, for example, for identification of atomic spectral lines.

For producing atomic resonance radiation it is known (see, for example, U.S. Pat. Specification No. 3,183,393) to use a device in which an electric discharge is maintained between an anode and a hollow cylindrical cathode which contains the material the resonance radiation of which is desired.

Such a device is known from French Patent Specification No. 1,371,588 in which a positive column discharge is effected at right angles to the axis of a hollow cathode between two additional electrodes at an area where there are atoms of the material the radiation of which is desired.

Furthermore a prior Dutch Patent Application not yet published proposes a low-pressure gas discharge lamp for producing atomic resonance radiation which lamp comprises a discharge space filled with a rare gas and having an envelope provided with a window which passes the radiation produced, and two electrodes between which a positive column discharge is maintained during operation, and which comprises a sputtering electrode as an atom source including an element the resonance radiation of which is desired. The positive column discharge is directed in such a manner that its axis intersects the window so that the radiation produced emerges from the lamp along this axis. The sputtering electrode surrounds the positive column and a ring is provided around the discharge path between sputtering electrode and window, which ring extends up to the vicinity of the sputtering electrode and the inner diameter of which is smaller than the inner diameter of the sputtering electrode, the length of said ring being at least equal to its inner diameter. It has been found that resonance radiation having a high intensity and a very narrow line profile can be produced by this lamp. This is a result of the special electrode configuration so that the phenomenon of the so-called self-absorption is limited to a minimum. A high intensity and a narrow line profile are required if a high absorption sensitivity is to be achieved in absorption spectroscopy.

In absorption spectroscopy the intensity of the radiation passed by the sample is measured, for which photosensitive cells are generally used. The output signal from these photocells generally has to be amplified before it can be applied to a measuring instrument, for example, a graphic recorder. To enable selective amplification of this signal, it is common practice to modulate the emitted resonance radiation before being passed through the sample by mechanically interrupting the beam periodically at a given frequency. The output signal of the photocell is then applied to an amplifier which is resonant for said given frequency.

In addition to mechanically interrupting the beam periodically it is known for the same purpose to periodically place an absorbing medium in the beam before it reaches the sample. For example, a flame may be put in the beam and atoms of a certain element may be introduced periodically in the flame. It is alternatively possible to direct the beam through the atomic vapor originating from a hollow cathode discharge which is then operated periodically.

All above-described methods of modulating resonance radiation have the drawback that separate devices such as a mechanical modulation device, a flame or a hollow cathode discharge are required.

A great drawback of mechanically interrupting the beam is the fact that spectral lines other than the desired ones are modulated as well. All devices described above for producing atomic resonance radiation employ a discharge in a rare gas atmosphere so that also the rare gas spectrum which is often much more intensive than the desired atomic vapor spectrum is emitted. One result is a comparatively high background level which is disturbing when detecting the radiation passed by the sample. The presence of the modulated rare gas spectrum therefore necessitates the use of a very sensitive monochromator to separate the desired resonance line from the other spectral lines.

If the beam is modulated with the aid of a flame in which the atoms of an element are sprayed periodically, the last-mentioned drawback is not experienced. However, this method cannot be performed with many elements which cannot be introduced in a flame in vapor form such as aluminum, zirconium, silicon, etc. In addition very low modulation frequencies are achieved in this manner.

The last-mentioned known method of modulating resonance radiation, wherein this radiation passes through the atomic vapor originating from a periodically operated hollow cathode discharge, has the drawback that the modulation depth is only small. During the periods of operation of the hollow cathode discharge a large number of atoms must be introduced in the beam if a complete absorption is to be achieved within these periods. If the modulation frequency is increased to, for example, 100 Hz. a considerable atom concentration will be present also during the periods when there is no hollow cathode discharge. In fact, the atoms must disappear by diffusion and the diffusion periods are comparatively long. A modulation depth of 100 percent is only approximated at very low frequencies, selective amplification being substantially impossible. Another drawback of this modulation method is that a modulated rare gas spectrum is generated in the hollow cathode discharge operated periodically which spectrum is passed and amplified by the selective amplifier. Hence, separation of the atomic vapor spectrum from the rare gas spectrum is not achieved in this case.

It is an object of the invention to provide a device for producing modulated atomic resonance radiation which does not have the above-mentioned drawbacks and which in addition makes it possible to substantially isolate the atomic vapor spectrum from the rare gas spectrum.

According to the invention a device for producing modulated atomic resonance radiation which comprises a discharge space and has an envelope provided with a window which passes the radiation produced, and two electrodes between which a positive column discharge in a rare gas is maintained, during operation, by means of a direct-voltage difference, is provided with a sputtering electrode which includes an element the resonance radiation of which is desired, and is characterized in that the axis of the positive column discharge intersects the window, that the sputtering electrode surrounds the positive column, that a ring is provided around the discharge path between the sputtering electrode and the window, which ring extends up to the vicinity of the sputtering electrode and the inner diameter of which is smaller than the inner diameter of the sputtering electrode, the length of said ring being at least equal to its inner diameter, and that a voltage of periodically varying value is applied to the sputtering electrode from a generator.

In a device according to the invention the atomic resonance radiation is not modulated afterwards, but is produced periodically. During the periods of the voltage applied to the sputtering electrode assuming a negative value relative to the positive column, atoms will be released from the sputtering electrode and are introduced in the column discharge, but due to the ring they remain limited to within the space of the sputtering electrode. The atoms are excited by the electrons from the column discharge whereafter they emit, inter alia, their resonance radiation. During the periods of the sputtering electrode voltage being not negative relative to the column, no atoms are any longer released from the sputtering electrode. During these periods the atom concentration will quickly decrease particularly in the neighborhood of the (common) axis of the column discharge and the sputtering electrode. In fact, due to ionization of the vapor atoms, the minimum of the atom concentration will always be located along this axis, because the electron concentration is greatest there. During the periods when the sputtering electrode does not supply atoms this ionization will continue (in fact, the column discharge is operated at a direct voltage). The vapor ions will quickly diffuse towards the sputtering electrode due to ambipolar diffusion. The diffusion periods at ambipolar diffusion are much shorter than those for atomic diffusion. Thus the atom concentration will be exhausted quickly particularly along the axis of the sputtering electrode so that a modulation depth of 100 percent can be achieved also at high modulation frequencies. Experiments have shown that no deviation from a modulation depth of 100 percent could be provided at a modulation frequency of 1000 Hz.

In a device according to the invention the rare gas spectrum remains unmodulated because the column discharge is a direct current discharge. Furthermore it has been found that the varying voltage which is applied to the sputtering electrode substantially does not influence the column discharge so that no modulated component is added to the rare gas spectrum. The ring, which limits the atomic vapor entirely to the space within the sputtering electrode and consequently limits the self-absorption of resonance radiation to a minimum, only passes the radiation emerging along the axis of the sputtering electrode. The conditions for a narrow line profile are best satisfied in the vicinity of this axis. In addition the ring has the advantage that radiation originating from the glow discharge on the wall of the sputtering electrode, part of which radiation consists of modulated rare gas radiation, is screened.

When using a device according to the invention in absorption spectroscopy the rare gas spectrum thus gives rise to a DC component in the output signal of the detector (for example, a photocell) which direct current is not passed by the selective AC amplifier. The part of the spectrum of the radiation emitted by the device and to be used of for measurements thus contains considerably fewer spectral lines due to the complete isolation of the atomic vapor spectrum from the rare gas spectrum. Consequently, it is possible in many cases to omit the use of a monochromator having a great resolving power. Such expensive monochromators are required in the known measuring arrangements to separate the resonance line of the element from all other spectral lines. In the case of elements having a spectrum which is poor in lines such as, for example, copper, it is even sufficient to have a rough filter. Simple monochromators or filters are also sufficient if the resonance lines of the element are located in the vicinity of lines from the rare gas spectrum such as is the case with calcium, strontium and tungsten in an argon discharge. The omission of a monochromator having a great resolving power results in a decrease of the absorption sensitivity because also nonabsorbing spectral lines of the element are passed. In addition, however, it is possible to work without narrow slit-diaphragms so that a much greater part of the beam can be utilized. The signal-to-noise ratio therefore becomes much more favorable and the minimum quantity of traces which can be measured in an unknown sample is equally large or even smaller than that for measuring arrangements which employ monochromators having a great resolving power.

The periodically varying voltage to be applied to the sputtering electrode is preferably a pulsatory negative voltage from a pulse generator. The pulse repetition frequency of this voltage may be chosen within very wide limits. Frequencies of between 5 and 5000 Hz. are, however, preferred because then a selective amplification can satisfactorily be performed and the modulation depth is at a maximum.

It is possible to provide more than one sputtering electrode in a device according to the invention. The sputtering electrodes all of which may contain a different element, surround the column discharge and are all located on the same axis. They are separated from one another by rings so that atoms from one sputtering electrode are prevented from depositing in another sputtering electrode. Furthermore this device includes a pulse generator for applying a pulsatory negative voltage to the sputtering electrodes, and this in such a manner that one or more negative pulses are alternately applied to the sputtering electrodes. In absorption spectroscopy this device provides the possibility of determining the contents of different elements in a sample without having to exchange a radiation source.

A device according to the invention is preferably used in an apparatus for measuring absorption of atomic resonance radiation, particularly for determining traces of elements in a sample. The said apparatus is furthermore provided with means for detecting the radiation passed by the sample, which means include a selective AC amplifier.

Special advantages are obtained if a device according to the invention including a plurality of sputtering electrodes is used in such an apparatus for measuring absorption of atomic resonance radiation. The means for detecting the radiation passed by the sample then include not only a selective AC amplifier but also a gating circuit to which the output signal of the amplifier is applied and which is synchronously operated by the pulses to be applied to a sputtering electrode. If a given number of sputtering electrodes is present in the device, the same number of gating circuits may be used all of which receive the output signal from the amplifier, while each gating circuit is operated synchronously with the pulses to be applied to one of the sputtering electrodes. It is then possible to determine the contents of different elements in a sample simultaneously and independently of each other.

In order that the invention may be readily carried into effect, a few embodiments thereof will now be described in detail by way of example with reference to the accompanying diagrammatic drawings, in which:

FIG. 3 is a graphic representation in which the time dependence of the electric voltages at given points in the apparatus of FIG. 2 is shown.

Figure 1:
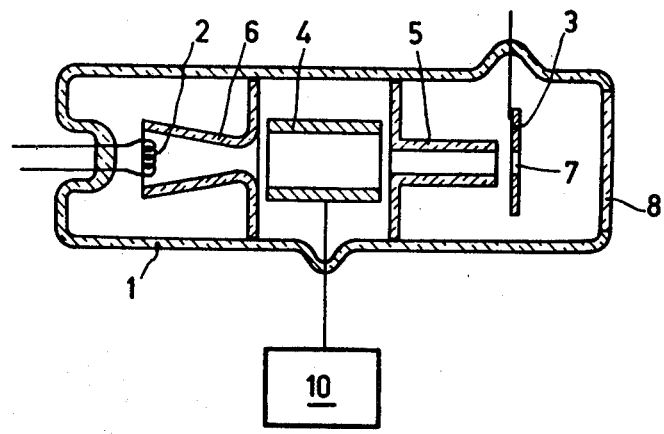
FIG. 1 shows an embodiment of a device according to the invention, partly in a cross section.

IN FIG. 1 the envelope, for example, of glass of a discharge tube is indicated by 1, in which tube a column discharge is maintained in a rare gas atmosphere between a thermionic cathode 2 and an anode 3. In this embodiment the discharge tube is filled with argon up to a pressure of 3 mm. Hg. A cylindrical copper sputtering electrode 4 having a length of 2 cm. and an internal diameter of 1 cm. surrounds the column discharge. A glass ring 5 is placed on the anode side of the sputtering electrode and comprises a cylindrical portion provided with a disclike portion which disclike portion extends up to the envelope 1 of the discharge tube. The internal diameter of the ring 5 is 4 mm. and its length is 2 cm. In this embodiment also a glass ring 6 is placed on the cathode side of the sputtering electrode. The copper radiation produced in the discharge tube emerges along the axis of the column discharge through a hole 7 in the anode and through a quartz glass window 8 in the envelope 1. The sputtering electrode 4 receives a pulsatory negative voltage at a pulse frequency of 1000 Hz. from a pulse generator 10. Measurements with the aid of this device have shown that substantially no modulated argon spectral lines are present in the radiation emitted by the device.

Figure 2:
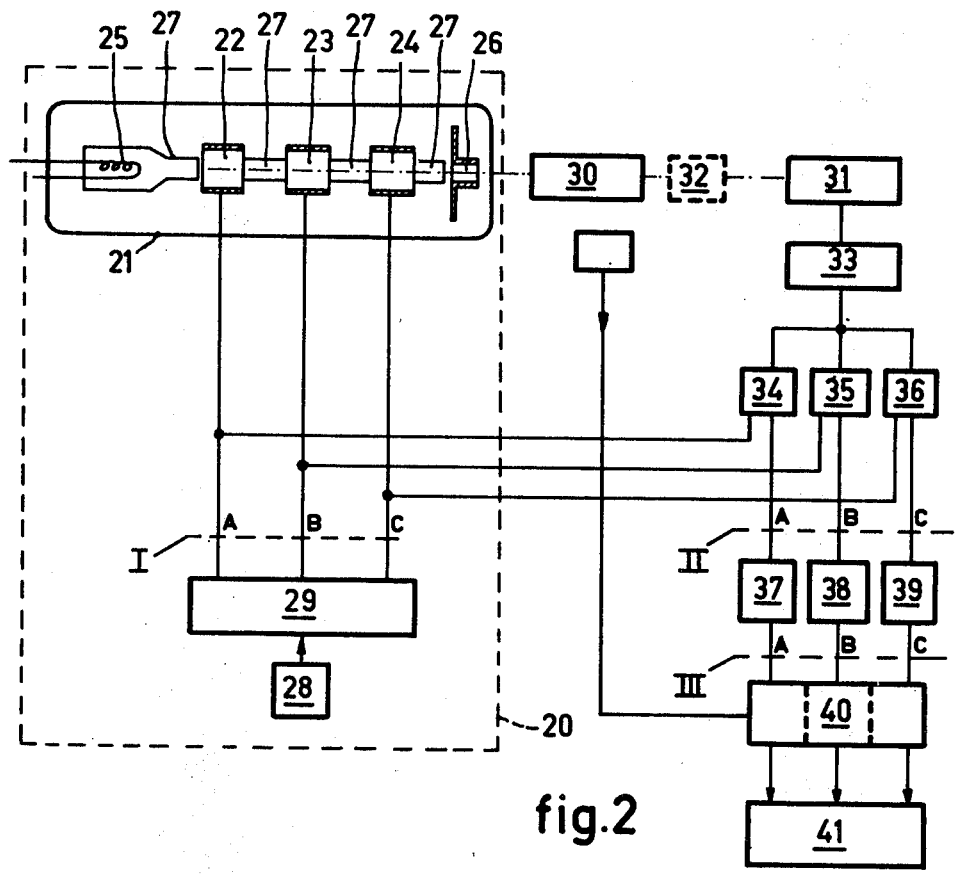
FIG. 2 shows an apparatus for measuring absorption of atomic resonance radiation according to the invention provided with a device according to the invention and including three sputtering electrodes.

In FIG. 2 the reference numeral 20 shows a device according to the invention, which is incorporated in an apparatus for measuring absorption of atomic resonance radiation according to the invention. The device 20 includes a discharge tube having a glass envelope 21 and containing three cylindrical sputtering electrodes 22, 23 and 24 of copper, iron and nickel, respectively. All sputtering electrodes surround the discharge path of a positive column discharge between a cathode 25 and an anode 26. Glass rings are indicated by the reference numeral 27. The device 20 furthermore includes a pulse generator 28 which applies negative voltage pulses at a pulse repetition frequency of 1000 Hz. to a ring circuit 29 which alternately applies a negative pulse to the sputtering electrodes 22, 23 and 24. A flame 30 in which a solution of an unknown sample is sprayed is placed in the beam produced by the device. The radiation passed by the flame is measured by a photocell 31. If desired a monochromator or a filter may be placed between the flame 30 and the photocell 31. Such a monochromator or filter is shown in a broken line in the Figure and is indicated by the reference numeral 32. The output signal of the photocell 31 is applied to a selective amplifier 33 which is resonant for a frequency of 1000 Hz. The output of the amplifier 33 is connected to three gating circuits 34, 35 and 36. The gating circuit 34 is connected to the sputtering electrode 22, so that this gating circuit passes the output signal of the amplifier 33 during the periods when the sputtering electrode 22 conveys a negative voltage. The gating circuits 35 and 36 are similarly connected to the sputtering electrodes 23 and 24, respectively. The outputs of the gating circuits 34, 35 and 36 are connected to integrators 37, 38 and 39, respectively. These integrators are read out at the end of a measurement by a reading apparatus 40 which receives a signal each time before a new sample is sprayed in the flame. The readout signal is registered by a graphic recorder 41.

In FIG. 3 the variation of the voltage V with the time $t$ is shown for a plurality of locations in the apparatus of FIG. 2. Plotted from the top down are the voltages $V_I(A)$, $V_I(B)$ and $V_I(C)$ applied to the sputtering electrodes 22, 23 and 24, respectively; the voltages $V_{II}(A)$, $V_{II}(B)$, and $V_{II}(C)$ supplied by the gating circuits 34, 35 and 36, respectively, and the variation of the voltages $V_{III}(A)$, $V_{III}(B)$ and $V_{III}(C)$ at the output terminals of the integrators 37, 38 and 39, respectively. A period of 1 msec. is shown on the time axis for the voltages $V_I$ and $V_{II}$. The variation of the voltages $V_{III}$ is indicated during the measurement of two samples. The measuring period consists of an integration period of 14 sec. and a readout period of 1 sec. For convenience' sake, all voltages (FIG. 3) are provided with a positive sign and are plotted in arbitrary units.

What I claim is:

1. A gas-discharge lamp for producing modulated atomic resonance radiation comprising a hermetically sealed cylindrical envelope having a window at one end to pass said radiation, two electrodes within said envelope for maintaining a positive column discharge along the longitudinal axis of said envelope, a hollow cylindrical sputtering electrode containing an element the desired resonance radiation characteristics of which is to be produced, said sputtering electrode being positioned between said electrodes to coaxially surround said discharge, means for periodically varying the polarity of the voltage to said sputtering electrode to produce intermittent resonance radiations, and a ring surrounding said discharge between the electrode at the window end and said sputtering electrode to restrict ionization within said sputtering electrode and produce desired resonance radiation along said longitudinal axis, said ring extending up to the vicinity of the sputtering electrode, and having an inner diameter smaller than the inner diameter of said sputtering electrode and a length at least equal to the inner diameter of said ring.

2. A gas-discharge lamp as claimed in claim 1 wherein means for periodically varying the voltage of said sputtering electrode comprises a negative voltage pulse generator.

3. A gas-discharge lamp as claimed in claim 2 wherein said negative voltage pulse generator has a pulse repetition frequency between 5 and 5000 Hz.

4. A gas-discharge lamp as claimed in claim 2 further comprising at least one additional sputtering electrode and ring positioned between said electrodes.

5. Apparatus for measuring absorption of modulated resonance radiation which comprises: a gas-discharge lamp for producing modulated resonance radiation, said lamp comprising a hermetically sealed cylindrical envelope having a window at one end for passing said radiation, two electrodes within said envelope for maintaining a positive column discharge along the longitudinal axis of said envelope, a plurality of hollow cylindrical sputtering electrodes having elements, the desired resonance radiation characteristics of which is to be produced, said sputtering electrodes being positioned between said electrodes to coaxially surround said discharge, and a plurality of rings surrounding said discharge between adjacent sputtering electrodes and between said electrodes for maintaining a positive column discharge and adjacent sputtering electrodes to restrict ionization within said sputtering electrodes and produce desired resonance radiation along said longitudinal axis, said rings, extending up to the vicinities of the sputtering electrodes, having inner diameter smaller than the inner diameters of the adjacent sputtering electrodes and lengths at least equal to the inner diameters of said ring; voltage generating means for producing voltages having varying polarities, switching means connected between said voltage generating means and the sputtering electrodes of said gas-discharge lamp for selectively applying the varying voltage polarities to each of said sputtering electrodes to produce intermittent resonance radiation during predetermined measuring intervals; thermal means for producing an atomic vapor representing elemental constituents of an unknown sample, positioned in the path of said produced resonance radiation; detecting means for producing electric signals representative of the resonance radiation transmitted through the atomic vapor; amplifying means for eliminating error signals from said produced electrical signals; gating means synchronized with said switching means to pass only amplified signals corresponding to resonance radiations from the selected sputtering electrode during each measuring interval; integrating means for converting said gated signals to voltages proportional to the resonance radiation absorbed during said measuring interval; and automatic means for reading out said voltage measurement during said measuring interval.

6. Apparatus for measuring absorption of resonance radiations as claimed in claim 5 wherein said plurality of sputtering electrodes comprise elements having different resonance radiation characteristics.

7. Apparatus for measuring absorption of resonance radiations as claimed in claim 5 further comprising light filtering means for the radiations from said thermal means.